United States Patent [19]
Ishibashi et al.

[11] Patent Number: 5,751,680
[45] Date of Patent: May 12, 1998

[54] OPTICAL DISK DRIVE

[75] Inventors: Toshiaki Ishibashi, Yokohama; Kunikazu Ohnishi, Yokosuka; Masayuki Inoue, Yokohamas-hi; Yoshio Suzuki, Yokohama, all of Japan

[73] Assignee: Hitachi, Ltd., Tokyo, Japan

[21] Appl. No.: 762,436

[22] Filed: Dec. 9, 1996

[30] Foreign Application Priority Data

Dec. 13, 1995 [JP] Japan .................................. 7-324741

[51] Int. Cl.⁶ .................................................. H04B 1/20
[52] U.S. Cl. ........................ 369/109; 369/112; 369/44.23
[58] Field of Search ............................... 369/109, 275.4, 369/275.3, 275.1, 44.11, 44.14, 44.37, 103, 110, 112, 44.23, 111

[56] References Cited

U.S. PATENT DOCUMENTS 5,515,354  5/1996  Miyake et al. ........................ 369/112
5,627,812  5/1997  Yamamoto et al. ................... 369/12

FOREIGN PATENT DOCUMENTS 3-37837  2/1991  Japan .

*Primary Examiner*—Ali Neyzari
*Attorney, Agent, or Firm*—Bardehle, Pagenberg, Dost, Altenburg, Frohwitter, Geissler

[57] ABSTRACT

Concerning a tilt detecting optical pickup in an optical disk playback device, a highly precise tilt error signal can be obtained by a simple structure. As a structure for achieving this, there are provided a diffraction grating, on which a grating groove pattern has been engraved, capable of adding coma aberration components to + and − primary diffracted light on an optical path between a laser diode, which becomes a playback light source, and an optical disk, and a light-receiving element capable of receiving the diffracted light. The output from a signal processing circuit capable of calculating a difference between each light receiving strength becomes a tilt error signal. By deforming the aforesaid grating groove pattern, the layout of the coma aberration components can be changed. Also, a tilt error signal can be obtained from a difference in bit error numbers in playback signals from diffracted light having coma aberration. Addition of coma aberration components to the diffracted light makes it possible to easily improve the sensitivity of a tilt error signal to the tilt angle.

11 Claims, 9 Drawing Sheets

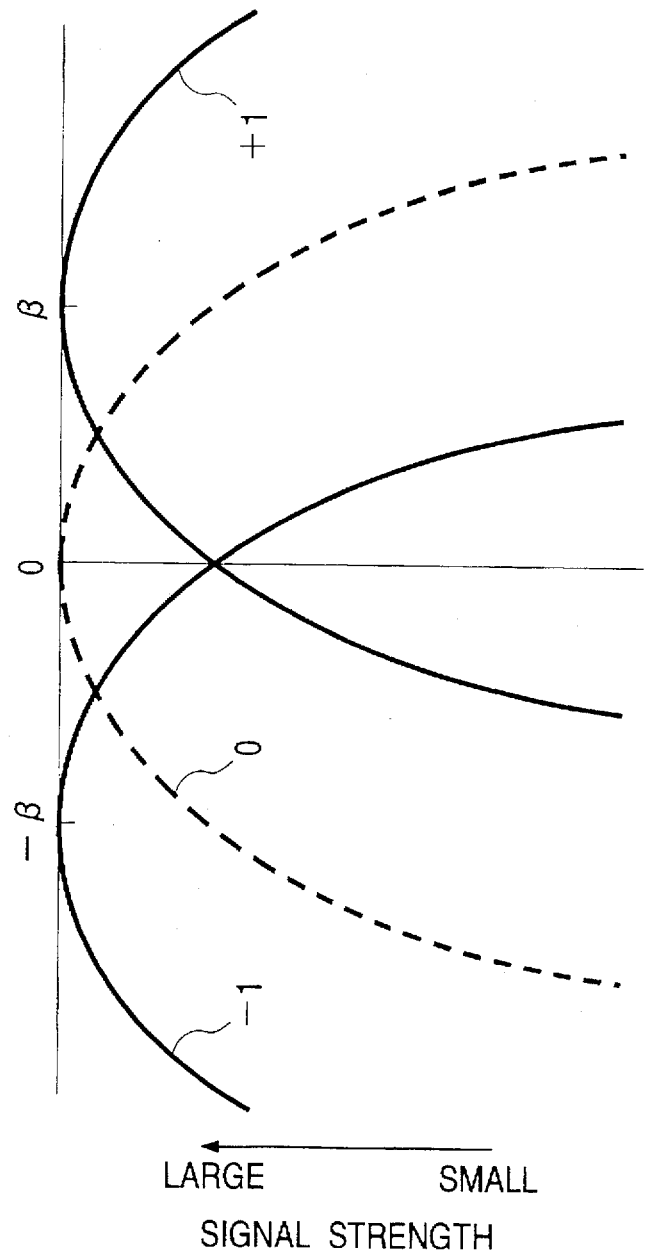

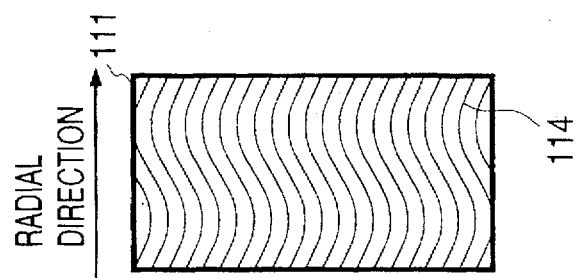
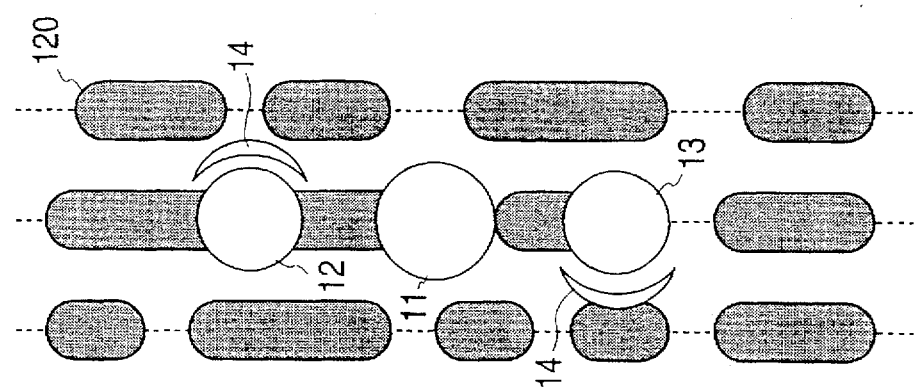

OPTICAL DISK DRIVE

BACKGROUND OF THE INVENTION

The present invention relates to a tilt detection device for detecting a tilt error signal (tilt of the optical axis of an optical pickup to the disk surface) in a device for playing back an optical disk represented by CD (compact disk), LD (laser disk) and the like, and implements high-precision tilt error detection by a simple structure.

An optical disk playback device for playing back an optical disk such as CD is designed so that the central axis of an objective lens for an optical pickup is perpendicular to the disk. In a case, however, where the disk is curved like an umbrella, the positional relation between the disk and the objective lens becomes perpendicular no longer even if the amount of curvature is slight, thus exerting a great influence on the signal playback performance of the optical pickup.

In order to prevent such inconvenience, a tilt control mechanism is provided for the optical disk playback device so as to adjust the tilt of the entire optical pickup. In a conventional tilt servo, such a tilt sensor 20 as shown in FIG. 9 is mounted to the optical pickup to detect a tilt error signal. The structure is arranged to irradiate light radiated from LED 22 to the disk 28 so that the reflected light is received by photodiodes 24, 26 provided at both ends of the LED.

Although the amounts of light received by the photodiodes 24 and 26 are the same when the optical axis of the optical pickup does not tilt to the disk 28, when it tilts, a difference is caused between the amounts of light received. Thus, the tilt angle of the optical pickup is controlled in accordance with this difference to thereby maintain the optical axis of the optical pickup to be perpendicular to the disk at all times.

FIG. 10 is a structural view showing the tilt control device. A tilt detector consisting of the above-described LED 22, and photodiodes 24, 26 is provided on the optical pickup 34, and light receiving signals received by the photodiodes 24, 26 are subtracted by the subtracter 32 to generate a tilt error signal. The tilt error signal thus generated is inputted to the driving circuit 33 to drive the motor 31 so that the optical pickup 34 is tilted with the fulcrum 30 as the center, thus making it possible to maintain an angle between the disk 28 and the optical pickup 34 to be perpendicular to each other.

Further, there is also proposed a method (Japanese Patent Laid-Open Application No. 3-37837: Tilt Detection Device for Optical Disk) in which a diffraction grating is inserted in an optical path of the optical pickup, ± primary light is used as a substitute for the aforesaid LED, and reflected light of the light from the disk is used as a light source for detecting a tilt error signal.

SUMMARY OF THE INVENTION

With a higher density of optical disks, specifications for optical pickups and disks have also become more severe. Tolerance for the tilt angle is also one of them, and high-precision control will be required.

The aforesaid conventional method is more difficult to obtain a high-precision tilt control signal than current methods, and has such problem that it becomes difficult to achieve tilt control which satisfies strict disk specifications.

It is an object of the present invention to provide an optical pickup for performing higher precision tilt servo by solving the above-described problems of the prior art.

An optical disk device according to the present invention comprises: a diffraction grating provided within a signal detecting optical pickup in an optical disk playback device, for forming diffracted light having coma aberration in a direction of pit rows in a disk to irradiate the disk surface; a tilt detecting light-receiving element for detecting reflected light of the aforesaid diffracted light from the disk surface; and tilt error detection means for generating a tilt error signal on the basis of the light receiving output of the aforesaid tilt detecting light-receiving element, or tilt error detection means for using diffracted light having coma aberration as playback light to generate a tilt error signal from an error number at the time.

According to the present invention, a signal beam is incident on a tilt beam forming diffraction grating to form diffracted light in the pit row direction recorded on the disk so that this diffracted light is irradiated onto the disk surface as tilt beam. The diffracted light formed here is added with a coma aberration component by the diffraction grating.

For this reason, when the disk is tilted, reflected light of one tilt beam from the disk surface has a greater coma aberration component while reflected light of the other tilt beam from the disk surface has a smaller coma aberration component. Accordingly, the sensitivity of the detection output in each tilt detecting light-receiving element is improved. Since the strength and position of the coma aberration component depend upon the diffraction grating pattern, they can be easily changed. Therefore, it is possible to set a pattern suitable for the disk specification.

Thus, with a simple structure in which a diffraction grating generating coma aberration is only incorporated in the signal detecting optical pickup for the optical disk, highly accurate tilt detection can be effected.

BRIEF DESCRIPTION OF THE DRAWINGS

FIG. 4 is a view showing relation between signal strength, and an angle between disk and light beam.

FIGS. 7(a) and 7(b) are a structural view showing a fourth embodiment according to the present invention;

DETAILED DESCRIPTION OF PREFERRED EMBODIMENTS

A tilt detecting optical pickup and a tilt control device according to the present invention will be described in detail below.

Figure 1B:
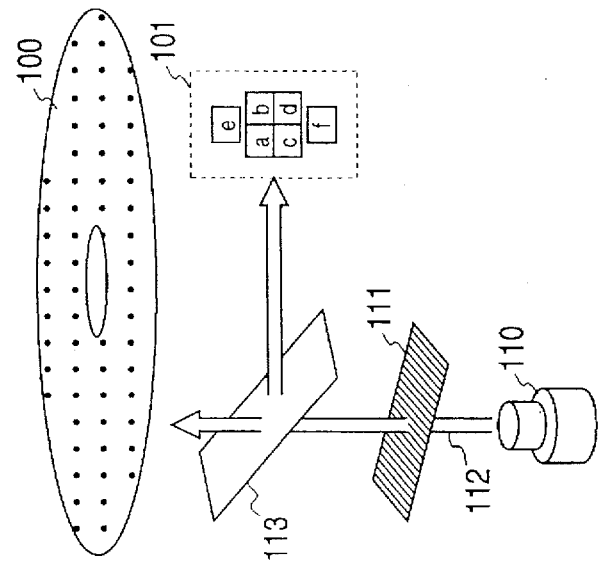
FIGS. 1(a)–1(c) show a tilt detecting optical pickup according to a first embodiment of the present invention.

FIG. 1 shows a tilt detecting optical pickup according to a first embodiment of the present invention. FIG. 1(b) shows a structure of an optical pickup system in an optical disk playback device. Herein, optical components such as a collimator lens which converts light beams into parallel waves, and an objective lens which concentrates light beams to form an optical spot on the disk 100, which have directly nothing to do with the concept of the present invention are omitted. Light beams 112 radiated from the laser diode 110 are incident on the diffraction grating 111 to generate zero order diffracted light and ± primary diffracted light. The ± primary diffracted light generated here has a coma aberration component.

These three light beams transmit through the half mirror 113 to focus on the disk surface. The light beams reflected from the disk surface are reflected by the half mirror 113 to irradiate the six-divided light-receiving element 101. The zero order diffracted light is irradiated to areas a to d on the six-divided light-receiving element 101, and is used to generate a playback signal, a focus error signal, and a tracking error signal. Each light beam of the ± primary diffracted light is irradiated to e and f of the six-divided light-receiving element 101, and is used to generate a tilt error signal.

Figure 1C:
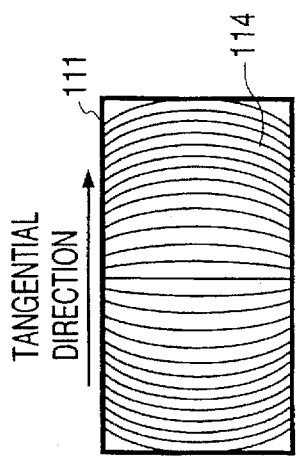
Figure 1A:
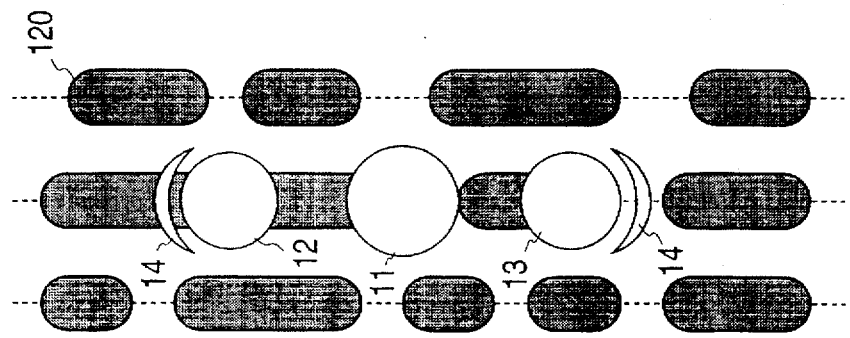

FIG. 1(a) is an enlarged plan view showing the shape of an optical spot on the disk. The + primary optical spot 12 and − primary optical spot 13, which have been generated by the diffraction grating 111, are located in the same direction as the pit row 120 on the pit row 120, and coma aberration components 14 and 15 added to each of them are arranged at symmetrical positions with respect to the zero order optical spot 11. FIG. 1(c) is a schematic plan view showing the diffraction grating 111 for forming a tilt beam. The grating groove pattern engraved on the diffraction grating 111 is not a linear one usually used because the diffraction grating 111 imparts a coma aberration component to the ± primary light. The detail will be described below.

Figure 2:
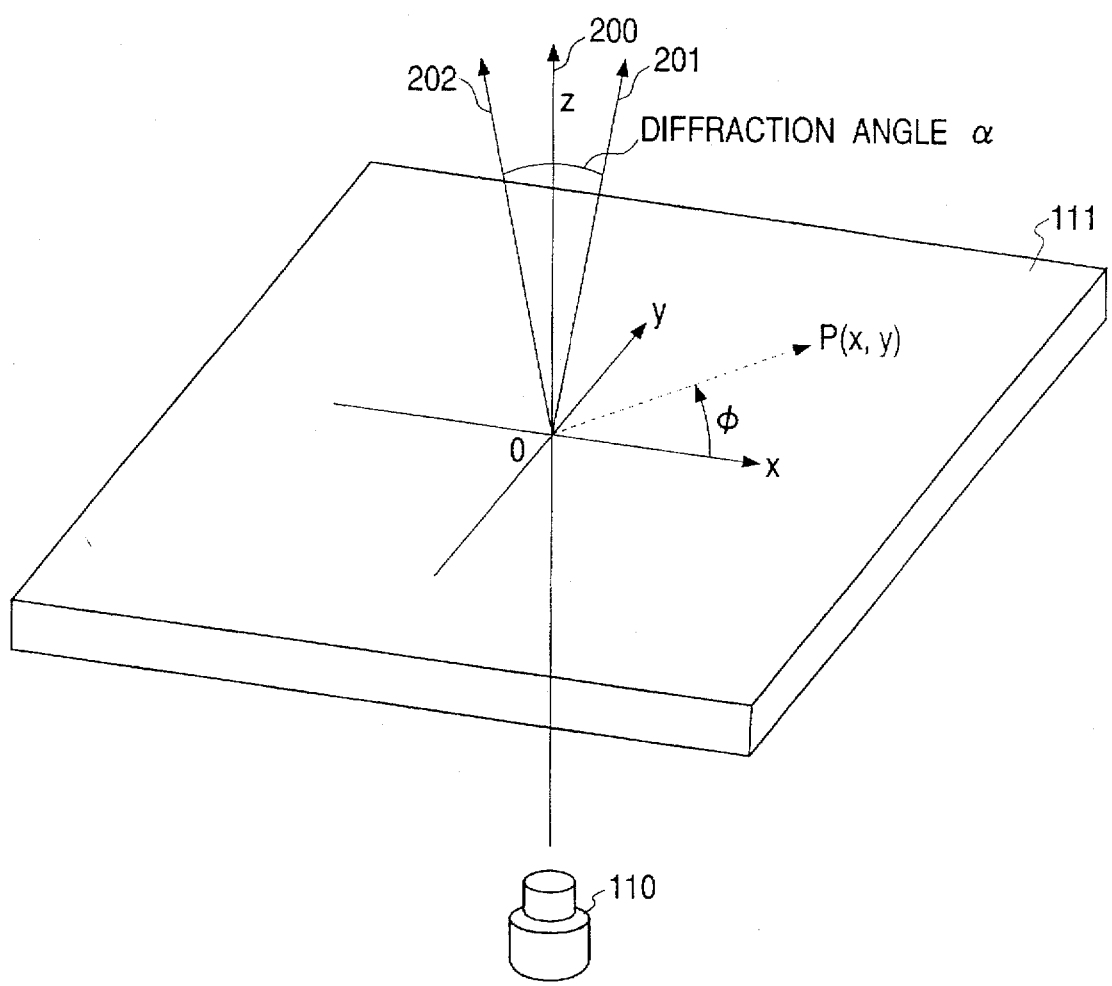
FIG. 2 is a conceptual block diagram for a diffraction grating for imparting coma aberration.

We consider such coordinate axes x, y, z as shown in FIG. 2 on the diffraction grating 111. It is assumed that a light beam with a wavelength $\lambda$ radiated from the laser diode 110 advances along z-axis, and is incident on the diffraction grating 111 to generate zero order light 200, + primary light 201 and − primary light 202 so that all light beams are juxtaposed in the z-axis direction.

A phase component S (x, y) added to the zero order light 200 by the + primary light 201 at an arbitrary point P (x, y) on the diffraction grating 111 surface is represented by the following equation.

$$S(x,y) = x \tan \alpha - 6(2)^{1/2} C(r^3 - \tfrac{2}{3}r) \cos \phi$$

However, $$-r = (x^2 + y^2)^{1/2} \text{ and } \phi = \tan^{-1}(y/x).$$

where the angle of diffraction $\alpha$ is an angle between the zero order light 200, and the + primary light 201 or the − primary light 202, and $\phi$ is an angle between a straight line for connecting between point P and the origin 0, and x-axis. C is a rms value of comma aberration added.

The above-described relational expression is described in "Lens Design Method" (page 72) by Yoshiya Matsui, published by Kyoritsu Shuppan on Oct. 10, 1979.

Therefore, the grating groove pattern 114 to add a coma aberration component to diffracted light is obtained by successively tracing a coordinate (xm, ym) which satisfies $$-S(x_m, y_m) = m\lambda; (m=0, \pm 1, \pm 2, \dots).$$

concerning the aforesaid S (x, y), and has such shape as shown in FIG. 1(c).

Figure 3:
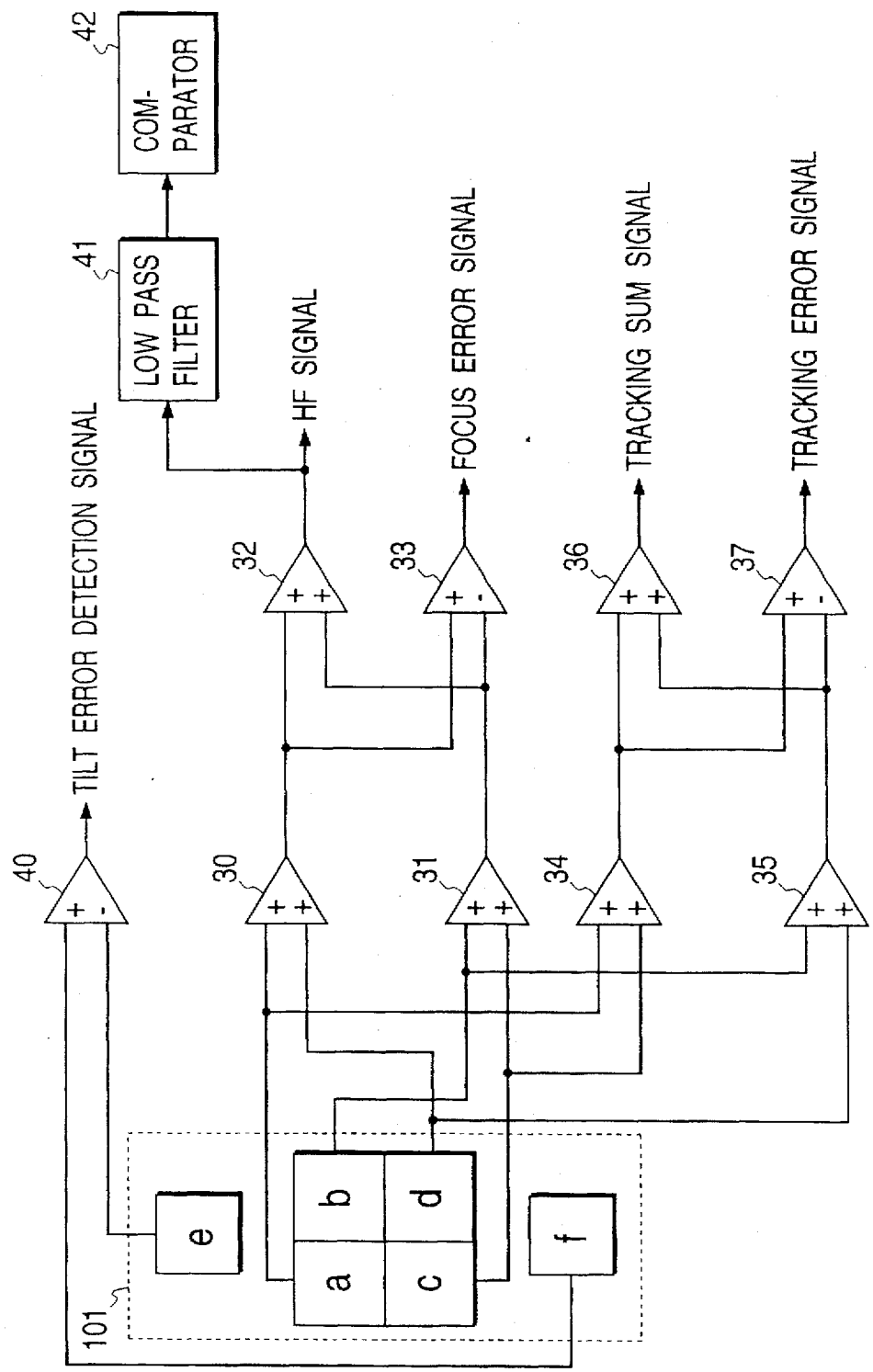
FIG. 3 is a structural view for light-receiving elements and signal processing circuits.

FIG. 3 shows a signal processing circuit for a light receiving signal in a six-divided light-receiving element 101. In light receiving signals a to d in the six-divided light-receiving element 101, the light receiving signals, which are in diagonal positions, are added in the adders 30 and 31 respectively. Each added output is further added in the adder 32 to obtain a HF signal. This HF signal is used for a playback signal. Also, the aforesaid added output is subtracted by a subtracter 33 to obtain a focus error signal, which is used for focus servo.

On the other hand, in order to generate a tracking error signal, each row of light receiving signals a to d in the six-divided light-receiving element 101 is added by the adders 34, 35 respectively. Each added output is subtracted by the subtracter 37 to generate a tracking error signal. Also, the aforesaid added output is added by the adder 36 to be used as a tracking sum signal.

Light receiving signals for tilt light-receiving elements e and f are subtracted by the subtracter 40 to obtain a tilt error signal. This signal is used for tilt servo. The detail will be described in detail.

FIG. 4 is a graph showing relation between an angle between the disk 100 and the light beam 112, and a light receiving signal. The signal strength is standardized by the maximum value of each signal, and the angle is regarded as 0 when the disk 100 is perpendicular to the light beam 112. As shown in FIG. 4, the signal strength of the zero order light 200 becomes maximum when the disk 100 is perpendicular to the light beam 112. However, the + primary light 201 and the − primary light 202, which are used as tilt beam, have been imparted a coma aberration component each by the diffraction grating 111 respectively in advance, and therefore, the light receiving signals for the light-receiving elements e and f cannot have maximum values in a state in which the disk 100 is perpendicular to the light beam 112.

When, however, an angle between the disk 100 and the light beam 112 becomes an angle $\beta$ or $-\beta$ which imparts an aberration component, which offsets the coma aberration component imparted by the diffraction grating 111, the light receiving signal s e and f in the six-divided light-receiving element 101 show maximum values. Since the coma aberration components imparted to the diffracted light exist in symmetrical directions to each other with respect to the zero order light 200, the signs (positive and negative) of the angles at which the light receiving signals become maximum are also reversed.

Accordingly, the output from the subtracter 40 in FIG. 3, i.e., the difference in strength between + primary 201 and − primary light 202 becomes 0 when the disk 100 is perpendicular to the light beam 112, and shows substantially linear characteristics between $-\beta$ and $\beta$.

The output signal from the adder 32 in FIG. 3 is inputted to a low pass filter 41, and the output signal therefrom is inputted to a comparator 42. A sum signal of a to d in the six-divided light-receiving element 101 has a maximum value when the disk 100 is perpendicular to the light beam 112, and reduces when the light beam 112 is tilted. Therefore, the control range can be defined by setting the reference value of the comparator 42 to a value within a range of $-\beta$ to $\beta$ in angle.

In other words, within the aforesaid control range, that is, when the input signal to the comparator 42 exceeds the aforesaid reference value, it is made possible to control the tilt through a tilt error signal from the subtracter 40. By transmitting, as a control signal, the output from the subtracter 40 to a tilt control device which has been often used conventionally, it becomes possible to make highly precise tilt control.

Figure 5B:
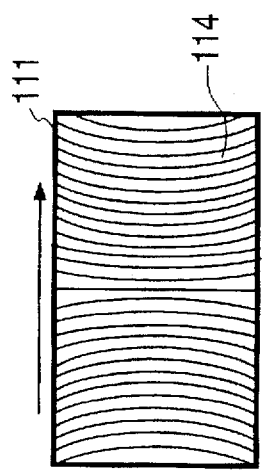
FIGS. 5(a) and 5(b) are enlarged views showing a disk and a diffraction grating according to a second embodiment of the present invention respectively.
Figure 5A:
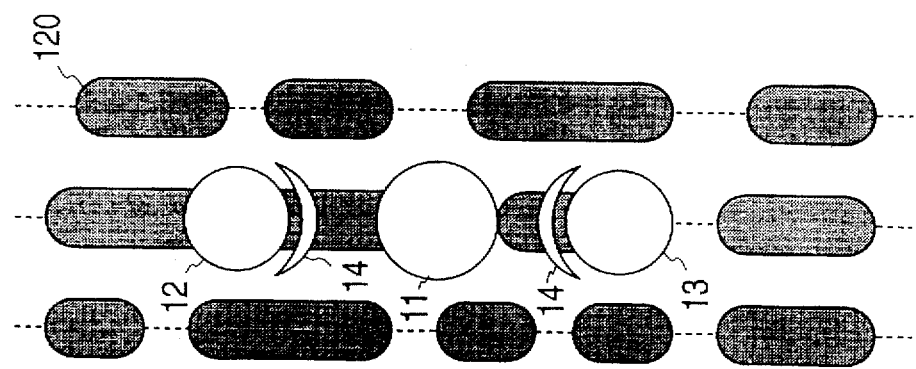

FIG. 5 shows the shape of spots on a disk in a tilt detecting optical pickup and a diffraction grating according to a second embodiment of the present invention: FIG. 5(a) is a structural view for optical spots on the disk surface; and FIG. 5(b) shows a grating groove pattern of the diffraction grating. As shown in FIG. 5(a), each coma aberration component 14 which accompanies the + primary light 201 and − primary light 202 generated by the diffraction grating 111 is located between the zero order optical spot 11 and the + primary optical spot 12, or between the zero order optical spot 11 and the − primary optical spot 13.

Even in such spot shape as described above, it is possible to generate the tilt error signal shown in the first embodiment. However, in order to generate such a spot, the grating groove pattern of the diffraction grating 111 must be formed as shown in FIG. 5(b). This pattern has a configuration in which arcs are drawn in the opposite direction to the grating groove pattern shown in the first embodiment.

Figure 6:
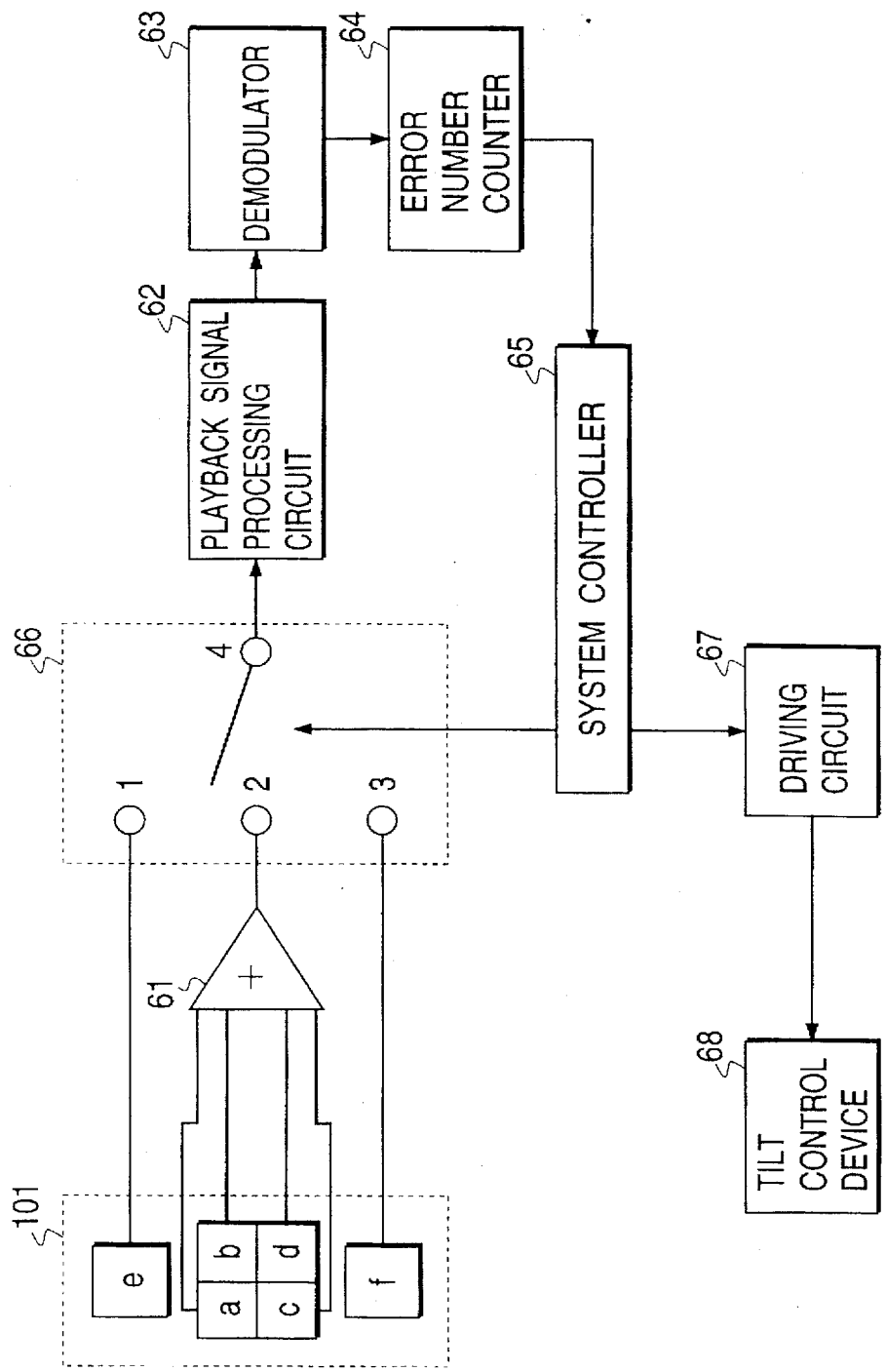
FIG. 6 is a structural view showing a third embodiment according to the present invention.

FIG. 6 is a system structural view illustrating a third embodiment according to the present invention. Light receiving signals received by a to d of the light-receiving element 101 are added by the adder 61. The output from this adder 61 is used as a normal playback signal, and is inputted to the playback processing circuit 62. Namely, the switch 66 is normally controlled by the system controller so that terminals 2 and 4 are connected together during playback.

However, the third embodiment according to the present invention is constructed so that tilt control is effected immediately after an optical disk is inserted, and that on this occasion, it is connected to another terminal.

First, on effecting the tilt control, the switch 66 is controlled by the system controller so that terminal 1 is connected to terminal 4. Thus, with + primary light 201 as playback light, the light receiving signal received by e of the light-receiving element 101 is successively inputted to the playback signal processing circuit, and to a demodulator 63. An error bit number of the playback signal is counted by an error number counter 64 to store, in the system controller, the error number when + primary light 201 is used as a playback signal.

Next, the switch 66 is controlled by the system controller so that terminal 3 is connected to terminal 4, and the error number by − primary light 202 is measured by using the same procedure. According to which is greater between the error numbers measured as described above, it can be determined in which direction the light beam 112 is tilted with respect to the disk 100. A signal for activating the tilt control device in such a direction as to correct the tilt is inputted from the system controller to a driving circuit 67 to activate the tilt control device in a fixed direction.

Error numbers are measured as described above, and an angle, at which error numbers obtained from each diffracted light coincide with one another, will be searched for. After the tilt correction operation is completed, terminal 2 and terminal 4 of the switch 66 are connected together by the system controller to shift to normal playback operation. The method for using error numbers as described above for tilt error signals has such advantage that the disk is not only geometrically made perpendicular to the light beam 112, but also an angle most suitable for playback can be set.

FIG. 7 shows the shape of spots on a disk in a tilt detecting optical pickup and the shape of a diffraction grating according to a fourth embodiment of the present invention: FIG. 7(a) is a structural view for optical spots on the disk surface; and FIG. 7(b) shows a grating groove pattern of the diffraction grating.

The zero order optical spot 11, + primary optical spot 12 and − primary optical spot 13 are juxtaposed in the pit row direction, and coma aberration components 14 accompanying the + primary optical spot 12 and − primary optical spot 13 are deviated not in the pit row direction but in the radial direction, and are generated in symmetrical positions to each other with respect to the zero order optical spot 11. When coma aberration components are provided in positions described above, such characteristics as shown in FIG. 4 are obtained when the disk 100 is tilted in the radial direction, thus making it possible to detect the tilt error in the radial direction.

A grating groove pattern engraved on the diffraction grating 111 to be used for forming such an optical spot as described above has such shape as shown in FIG. 7(b), and has a feature that with the center of the diffraction grating 111 as a border line, a direction in which one half of the grating groove pattern 114 is curved becomes opposite to a direction in which the other half thereof is curved.

Figure 8B:
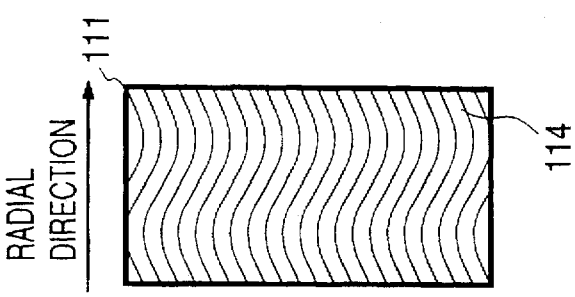
FIGS. 8(a) and 8(b) are a structural view showing a fifth embodiment according to the present invention.
Figure 8A:
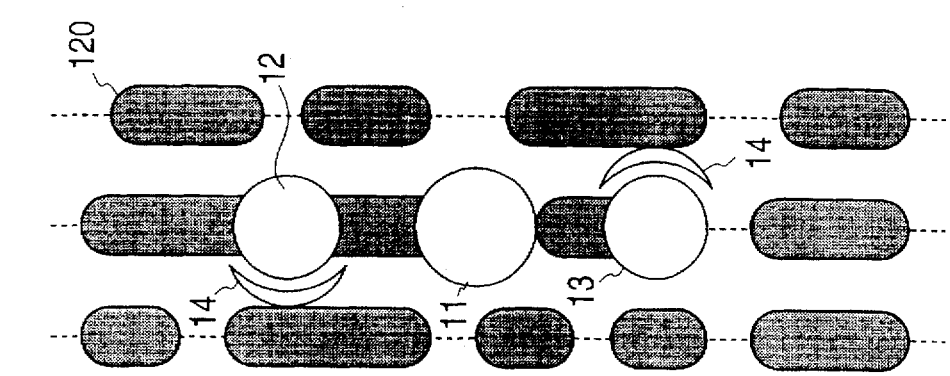
Figure 9:
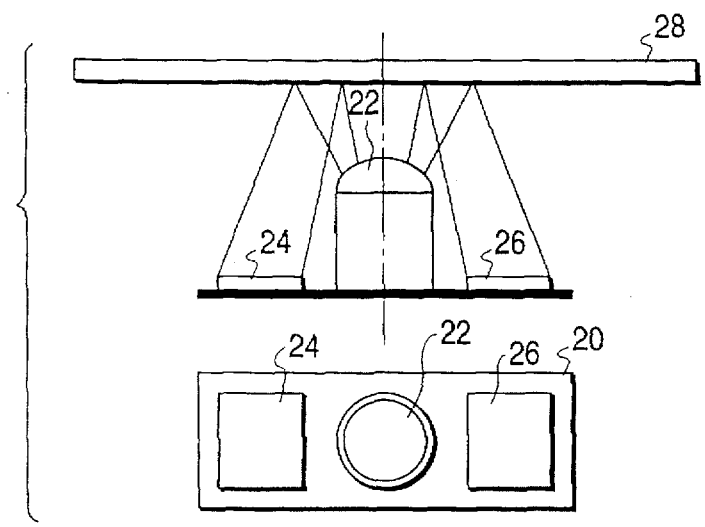
FIG. 9 is a front and plan view showing a conventional tilt sensor.
Figure 10:
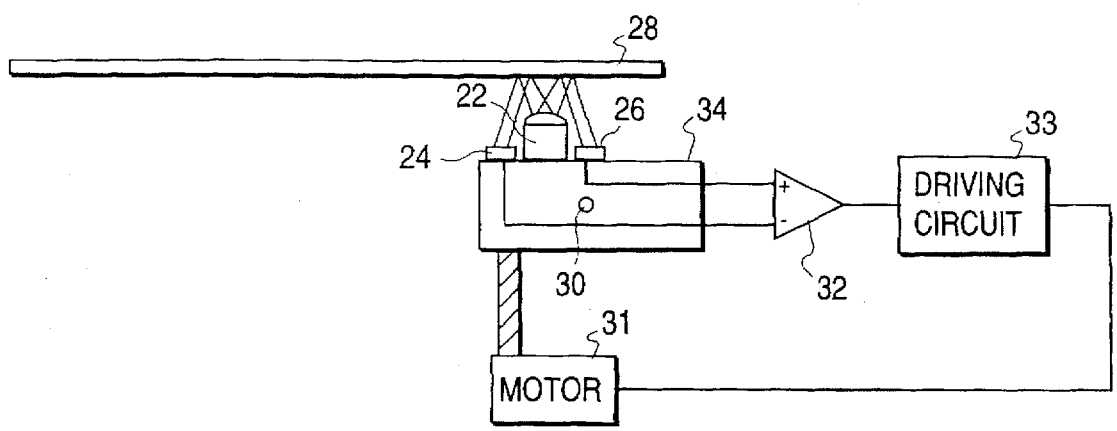
FIG. 10 is a structural view showing a conventional tilt control device.

FIG. 8 shows the shape of spots on a disk in a tilt detecting optical pickup and the shape of a diffraction grating according to a fifth embodiment of the present invention: FIG. 8(a) is a structural view for optical spots on the disk surface; and FIG. 8(b) shows a grating groove pattern of the diffraction grating. The coma aberration components 14 accompanying the + primary optical spot 12 and − primary optical spot 13 are opposite to the structure of optical spots shown in FIG. 7.

Even with such a structure, the characteristics shown in FIG. 4 can be obtained for the tilt of the disk in the radial direction, and tilt error signals can be detected. The grating groove pattern 114 on the diffraction grating required to obtain the structure of optical spots shown in FIG. 8(a) is laterally opposite to the pattern shown in FIG. 7(b).

With either of the shape of optical spots shown in FIGS. 7 and 8, such signal processing as shown in FIGS. 3 and 6 is effected to thereby enable tilt control in the radial direction.

According to the above-described invention, it becomes possible to detect higher precise tilt error signals with a number of components in the optical pickup remained unchanged, and more stable playback/recording can be performed by tilt control using tilt error signals thus obtained.

What is claimed is:

1. An optical disk device, comprising:
   a diffraction grating, provided on a path in a signal playback optical system for an optical disk device, on which there has been engraved a grating groove pattern capable of adding a coma aberration component to a + primary diffracted light and a − primary diffracted light to be generated in a pit row direction in a disk respectively;

a first light receiving element and a second light receiving element capable of respectively receiving reflected light of said + primary diffracted light and said − primary diffracted light having said coma aberration component respectively from the surface of said disk; and a signal processing circuit for calculating a difference in strength between respective output signals from said first and second light-receiving elements, tilt control being effected using said strength difference signal.

2. An optical disk device as defined in claim 1, wherein the coma aberration components added by said diffraction grating to said + primary diffracted light and said + primary diffracted light to be generated in the pit row direction in said disk respectively are positioned symmetrically with respect to a zero order optical spot, and exist at positions further apart from their respective primary optical spots with said zero order optical spot as reference.

3. An optical disk device as defined in claim 1, wherein the coma aberration components added by said diffraction grating to said + primary diffracted light and said − primary diffracted light to be generated in the pit row direction in said disk respectively are positioned symmetrically with respect to a zero order optical spot, and are positioned between said zero order optical spot and their respective primary optical spots.

4. An optical disk device as defined in claim 1, wherein the coma aberration components added by said diffraction grating to said + primary diffracted light and said − primary diffracted light to be generated in the pit row direction in said disk respectively are positioned along their respective primary optical spots in the radial direction of said disk, and the coma aberration component to be added to said + primary diffracted light is positioned on the outer periphery side of said disk, while the coma aberration component to be added to said − primary diffracted light is positioned on the inner periphery side thereof.

5. An optical disk device as defined in claim 1, wherein the coma aberration components added by said diffraction grating to said + primary diffracted light and said − primary diffracted light to be generated in the pit row direction in said disk respectively are positioned along their respective primary optical spots in the radial direction of said disk, and the coma aberration component to be added to said + primary diffracted light is positioned on the inner periphery side of said disk, while the coma aberration component to be added to said − primary diffracted light is positioned on the outer periphery side thereof.

6. An optical disk device, comprising:

a diffraction grating, provided on a path in a signal playback optical system for an optical disk device, on which there has been engraved a grating groove pattern capable of adding a coma aberration component to a + primary diffracted light and a − primary diffracted light to be generated in a pit row direction in a disk respectively;

a first light-receiving element and a second light-receiving element capable of respectively receiving reflected light of said + primary diffracted light and said − primary diffracted light having said coma aberration component respectively from the surface of said disk;

signal processing means for counting and storing an error bit number for playback signals from said first and second light receiving elements;

switching means for switching a first output signal from said first light-receiving element for receiving reflected light of said + primary diffracted light, and a second output signal from said second light-receiving element for receiving reflected light of said − primary diffracted light to connect to said signal processing means; and a controller for distinguishing which is greater between an error bit number in said first output signal and that in said second output signal, tilt control being effected using said distinguishing signal.

7. An optical disk device as defined in claim 6, wherein the coma aberration components added by said diffraction grating to said + primary diffracted light and said − primary diffracted light to be generated in the pit row direction in said disk respectively are positioned symmetrically with respect to said zero order optical spot, and exist at positions further apart from their respective primary optical spots with said zero order optical spot as reference.

8. An optical disk device as defined in claim 6, wherein the coma aberration components added by said diffraction grating to said + primary diffracted light and said − primary diffracted light to be generated in the pit row direction in said disk respectively are positioned symmetrically with respect to said zero order optical spot, and are positioned between said zero order optical spot, and their respective primary optical spots.

9. An optical disk device as defined in claim 6, wherein the coma aberration components added by said diffraction grating to said + primary diffracted light and said − primary diffracted light to be generated in the pit row direction in said disk respectively are positioned along their respective primary optical spots in the radial direction of said disk, and the coma aberration component to be added to said + primary diffracted light is positioned on the outer periphery side of said disk, while the coma aberration component to be added to said − primary diffracted light is positioned on the inner periphery side thereof.

10. An optical disk device as defined in claim 6, wherein the coma aberration components added by said diffraction grating to said + primary diffracted light and said − primary diffracted light to be generated in the pit row direction in said disk respectively are positioned along their respective primary optical spots in the radial direction of said disk, and the coma aberration component to be added to said + primary diffracted light is positioned on the inner periphery side of said disk, while the coma aberration component to be added to said − primary diffracted light is positioned on the outer periphery side thereof.

11. An optical disk device, comprising:

a diffraction grating, provided on a path in a signal playback optical system for an optical disk device, on which there has been engraved a grating groove pattern capable of adding a coma aberration component to a + primary diffracted light and a − primary diffracted light to be generated in a pit row direction in a disk respectively;

a first light-receiving element and a second light-receiving element capable of respectively receiving reflected light of said + primary diffracted light and said − diffracted light having said coma aberration component respectively from the surface of said disk;

a signal processing circuit for calculating a difference in strength between respective output signals from said first and second light-receiving element;

a third light-receiving element for receiving reflected light of said zero order diffracted light from said disk surface, and using said output as a playback signal; and a comparator for judging whether or not the output from said third light-receiving element exceeds a prescribed reference value, tilt control being effected using said strength difference signal when said comparator judges that said output exceeds said reference value.

* * * * *